(12) United States Patent
Wang et al.

(10) Patent No.: US 8,542,781 B2
(45) Date of Patent: Sep. 24, 2013

(54) INCREMENTALLY INCLUSIVE FREQUENCY DOMAIN SYMBOL JOINT DETECTION

(75) Inventors: Yi-Pin Eric Wang, Fremont, CA (US); Dennis Hui, Cupertino, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 389 days.

(21) Appl. No.: 13/050,697

(22) Filed: Mar. 17, 2011

(65) Prior Publication Data

US 2012/0051467 A1  Mar. 1, 2012

Related U.S. Application Data

(60) Provisional application No. 61/378,556, filed on Aug. 31, 2010.

(51) Int. Cl.
*H04L 27/00* (2006.01)

(52) U.S. Cl.
USPC .......................................................... 375/340

(58) Field of Classification Search
USPC .................................. 375/340, 341, 260, 267
See application file for complete search history.

(56) References Cited

U.S. PATENT DOCUMENTS

| | | | | |
|---|---|---|---|---|
| 5,757,791 A | * | 5/1998 | Kanterakis et al. | 370/342 |
| 8,351,549 B1 | * | 1/2013 | Choi et al. | 375/341 |
| 2008/0298491 A1 | * | 12/2008 | Jung et al. | 375/260 |
| 2010/0103983 A1 | * | 4/2010 | Wang et al. | 375/141 |
| 2011/0075767 A1 | * | 3/2011 | Bottomley et al. | 375/340 |

FOREIGN PATENT DOCUMENTS

| | | |
|---|---|---|
| GB | 2 472 906 A | 2/2011 |
| WO | 2008/027554 A2 | 3/2008 |

OTHER PUBLICATIONS

Dai et al, "A Comparative Study of QRD-M Detection and Sphere Decoding for MIMO-OFDM Systems", 2005 IEEE 16th International Symposium on Personal, Indoor and Mobile Radio Communications, 2005, Berlin Germany, Sep. 11-14, 2005, Piscataway, NJ, vol. 1, pp. 186-190.

Kimura et al, "Multiple-QR-Decomposition Assisted Group Detection for Reduced-Complexity-and-Latency MIMO-OFDM Receivers", The 17th Annual IEEE International Symposium on Personal, Indoor and Mobile Radio Communications (PIMRC'06), Sep. 1, 2006, pp. 1-5.

International Search Report and Written Opinion mailed Dec. 19, 2011 in PCT Application No. PCT/IB2011/053801.

Sari et al, "Frequency-domain equalization of mobile radio and terrestrial broadcast channels" in Proc. IEEE Global Telecommun. Conf., vol. 1, Nov. 1994.

Bottomomley et al, "Subblock Equalization and Code Averaging for DS-CMDA Receivers", IEEE Transactions on Vehicular Technology, vol. 59, No. 7, Sep. 2010, pp. 3321-3331.

(Continued)

*Primary Examiner* — Aristocratis Fotakis
(74) *Attorney, Agent, or Firm* — Nixon & Vanderhye, P.C.

(57) ABSTRACT

In one of its aspects the technology disclosed herein concerns a method of operating a receiver. The method comprises performing symbol detection by (1) receiving a frequency-domain signal that comprises contribution from time-domain symbols transmitted from one or more transmit antennas; (2) generating a transformation matrix and a triangular matrix based on a frequency domain channel response; (3) using the transformation matrix to transform the received frequency-domain signal to obtain a transformed frequency-domain signal; and (4) performing symbol detection by performing plural stages of detection, each stage of detection using elements of the transformed frequency-domain received signal associated with the detection stage.

21 Claims, 12 Drawing Sheets

(56) References Cited

OTHER PUBLICATIONS

Berardinelli et al, "Improving SC-FDMA performance by turbo equalization in UTRA LTE uplink" in Proc. IEEE Veh. Technol. Conf. (VTC), Singapore, May 11-14, 2008, pp. 2557-256.

U.S. Appl. No. 13/050,210, filed Mar. 17, 2011, entitled "Symbol Detection for alleviating inter-symbol interference".

U.S. Appl. No. 13/050,433, filed Mar. 17, 2011, entitled "Frequency-Domain Multi-Stage Group Detection for alleviating inter-symbol interference".

U.S. Appl. No. 13/050,697, filed Mar. 17, 2011, entitled "incrementally inclusive frequency domain symbol joint detection".

Riskin, "Optimal bit allocation via the generalized BFOS algorithm," IEEE Trans, Info Thy., vol. 37, pp. 400-402, Mar. 1991.

Soderstrom et al, System Identification, Prentice Hall, 1989.

Choi et al., "Efficient Soft-Input Soft-Output MIMO Detection Via Improved M-Algorithm", Proceedings of 2010 IEEE International Conference on Communications.

Baek et al., "Combined QRD-M and DFE Detection Technique for Simple and Efficient Signal Detection in MIMO-OFDM Systems", IEEE Transactions on Wireless Communications, vol. 8, No. 4, Apr. 2009; pp. 1632-1638.

Jelinek et al., "Instrumental Tree Encoding of Information Sources", IEEE Transactions on Information Theory, Jan. 1971, pp. 118-119.

Anderson et al., "Sequential Coding Algorithms: A Survey and Cost Analysis", IEEE Transactions on Communications, vol. COM-32, No. 2, Feb. 1984, pp. 169-176.

Notice of Allowance mailed May 9, 2013 in U.S. Appl. No. 13/050,443.

Office Action mailed Apr. 25, 2013 in U.S. Appl. No. 13/050,210.

* cited by examiner

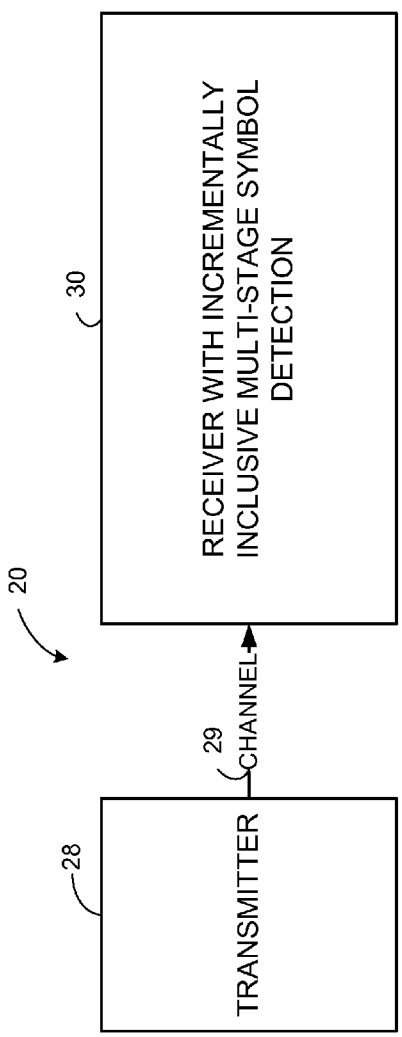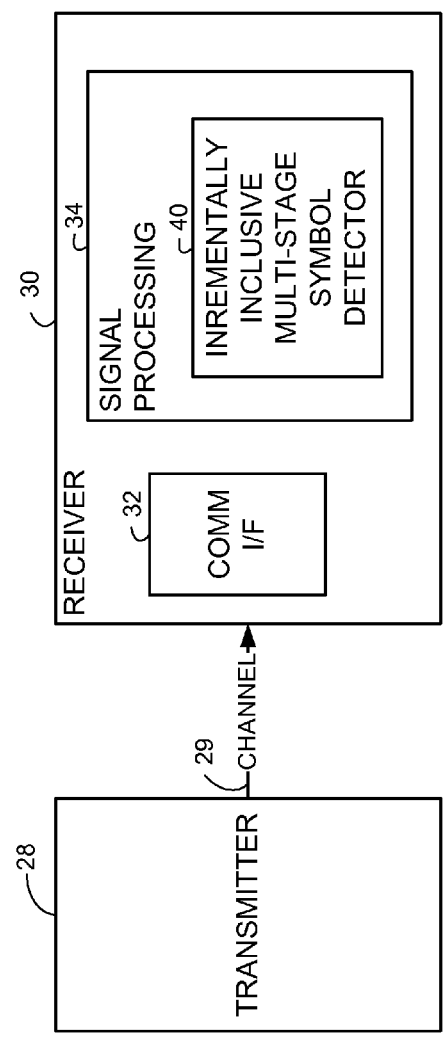

INCREMENTALLY INCLUSIVE FREQUENCY DOMAIN SYMBOL JOINT DETECTION

This application claims the priority and benefit of U.S. Provisional Patent application 61/378,556, filed Aug. 31, 2010, entitled Frequency-Domain Subblock Equalization for Uplink LTE to Alleviate Inter-Symbol Interference", which is incorporated herein by reference in its entirety.

This application is related to U.S. patent application Ser. No. 13/050,210, filed on Mar. 17, 2011, entitled "SYMBOL DETECTION FOR ALLEVIATING INTER-SYMBOL INTERFERENCE", which is incorporated herein by reference in its entirety.

This application is related to U.S. patent application Ser. No. 13/050,433, filed on Mar. 17, 2011, entitled "FREQUENCY-DOMAIN MULTI-STAGE GROUP DETECTION FOR ALLEVIATING INTER-SYMBOL INTERFERENCE", which is incorporated herein by reference in its entirety.

TECHNICAL FIELD

This invention pertains to telecommunications, particularly to detection of symbols transmitted over a radio channel, and more particularly to joint detection of both a time dimension overlapping symbol and a space dimension overlapping symbol.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the 3$^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

Long Term Evolution (LTE) uses single-carrier frequency-division multiple access (SC-FDMA) in an uplink direction from the wireless terminal to the eNodeB. SC-FDMA is advantageous in terms of power amplifier (PA) efficiency since, e.g., the SC-FDMA signal has a smaller peak-to-average ratio than an orthogonal frequency division multiple access (OFDM) signal. However, SC-FDMA gives rise to inter-symbol interference (ISI) problem in dispersive channels. Addressing inter-symbol interference (ISI) can enable SC-FDMA to improve power amplifier efficiency without sacrificing performance.

Frequency-domain (FD) linear equalization (LE) is commonly used in the LTE uplink to deal with inter-symbol interference (ISI). In frequency domain linear equalization, inter-symbol interference (ISI) is modeled as colored noise, which is then suppressed by the linear equalization. A popular linear equalization approach is linear minimum mean square error (LMMSE) equalization. Linear minimum mean square error (LMMSE) equalization is described, e.g., by H. Sari, G. Karam, and I. Jeanclaude, "Frequency-domain equalization of mobile radio and terrestrial broadcast channels," in Proc. IEEE Global Telecommun. Conf., vol. 1, November 1994, which is incorporated herein by reference in its entirety. However, performance of LMMSE equalization is limited. When the allocated bandwidth is large and when the channel is highly dispersive, a more sophisticated receiver is needed in order to ensure robust reception.

Soft cancellation-based MMSE turbo equalization has been considered for use on the uplink in LTE. With a receiver using soft cancellation-based MMSE turbo equalization, inter-symbol interference (ISI) is cancelled via soft decision-feedback equalization (DFE), where the tentatively detected soft symbols are determined based on turbo decoder outputs. The performance of such a receiver improves when more information exchanges between the decoder and soft DFE/demodulator take place. Although turbo equalization achieves superior performance, it incurs a large latency due to the iterative demodulation and decoding process.

Maximum-likelihood detection (MLD) is a well-known approach to address the inter-symbol interference (ISI) and multiple input/multiple output (MIMO) interference. Maximum-likelihood detection (MLD) does not involve the decoder cooperation and thus does not incur as a long latency as turbo equalization does. However, when there are too many overlapping symbols, Maximum-likelihood detection (MLD) becomes impractical due to complexity.

Codes with a tree structure have been used in the equalization of band-limited nonlinear channels by sequence estimation. Since it is generally not practical to view and weigh all the branches in a tree structured code, a search algorithm is usually employed. Code searching algorithms may be classified in various ways, such as sorting or non-sorting, depth-first, breadth-first, or metric-first (where the metric is some measure of likelihood). A purely breadth-first algorithm that sorts is the M-algorithm. The M-algorithm is described, e.g., in the following: Choi et al., "Efficient Soft-Input Soft-Output MIMO Detection Via Improved M-Algorithm", Proceedings of 2010 IEEE International Conference on Communications;

Baek et al., "Combined QRD-M and DFE Detection Technique for Simple and Efficient Signal Detection in MIMO-OFDM Systems", *IEEE Transactions on Wireless Communications*, Vol. 8, No. 4, April 2009; pages 1632-1638; Jelinek et al., "Instrumental Tree Encoding of Information Sources", *IEEE Transactions on Information Theory*, January 1971, pp. 118-119; and Anderson et al., "Sequential Coding Algorithms: A Survey and Cost Analysis", *IEEE Transactions on Communications*, Vol. COM-32, No. 2, February 1984, pages 169-176, all of which are incorporated herein by reference.

SUMMARY

In one of its aspects the technology disclosed herein concerns a method of operating a receiver. The method comprises performing symbol detection by (1) receiving, over a radio channel, a frequency-domain signal that comprises contribution from time-domain symbols transmitted from one or more transmit antennas; (2) generating a transformation matrix and a triangular matrix based on a frequency domain channel response of the radio channel; (3) using the transformation matrix to transform the received frequency-domain signal to obtain a transformed frequency-domain signal; and (4) performing symbol detection by performing plural stages of detection, each stage of detection using elements of the transformed frequency-domain received signal associated with the detection stage.

The plural stages of detection comprise a first detection stage; one or more intermediate detection stages; and a last detection stage. For the first detection stage the symbol detection comprises: forming hypotheses for the first detection stage based on possible modulation values of one of the time-domain symbols; evaluating detection metrics formed for the first detection stage for all the hypotheses; and in accordance with evaluation of the detection metrics, retaining a predetermined number of best hypotheses from the first detection stage.

In the intermediate stage(s) the method comprises jointly detecting a number of time-domain symbols including an additional time-domain symbol that was not detected in any of the previous stages and all the time-domain symbols that were jointly detected in the previous stages. In particular, for the intermediate detection stage(s) the method comprises: forming joint hypotheses for the intermediate stage based on possible modulation values used by the additional time-domain symbol and the retained joint hypotheses for the time-domain symbols that were jointly detected in the immediately preceding stage; evaluating detection metrics for all the hypotheses formed for the intermediate stage; and, retaining a predetermined number of best hypotheses from the intermediated stage.

In the last detection stage the method comprises ultimately jointly detecting all the time-domain symbols.

In an example embodiment and mode the method further comprises using a filter to filter the received frequency-domain signal prior to using the transformation matrix to obtain the transformed frequency-domain signal; and determining filter coefficients for the filter based on impairment correlation properties of the frequency-domain received signal.

In an example embodiment and mode the method further comprises factoring a system matrix to obtain a transformation matrix and a triangular matrix; using the transformation matrix and a filtered frequency-domain received signal to obtain a transformed frequency-domain received signal; and for each stage of detection, evaluating the detection metric using elements of the transformed frequency-domain received signal associated with the stage and elements of the triangular matrix associated with the stage. In such example embodiment and mode the system matrix depends (e.g., is a product of) on an impairment covariance matrix of the frequency-domain received signal; an estimate of the channel response of the frequency-domain received signal; and a matrix used to perform frequency domain to time domain conversion of the symbols of the frequency-domain received signal.

In an example embodiment, a first set of filter coefficients and the transformation matrix may be combined to form a new transformation matrix, and the new transformation matrix may be used to directly transform the original frequency-domain received signal to obtain a transformed frequency-domain received signal.

In an example embodiment and mode wherein symbols $s(0)$ through $s(K-1)$ comprise a block of symbols, the method is configured so that for the first stage the one of the time-domain symbols is symbol $s(K-1)$; for the second stage the new time-domain symbol is symbol $s(K-2)$; and for a $g^{th}$ stage the new time-domain symbol is symbol $s(K-g)$.

Symbols $s(0)$ through $s(K-1)$ may be a subblock within a bigger block of symbols. Thus, the scheme according to the technology disclosed herein may be used as a subblock equalization and detection scheme In an example embodiment and mode the receiver comprises a base station, and wherein the method further comprising receiving the frequency-domain received signal on an uplink channel. In an example embodiment and mode the uplink channel is at least one of a Physical Uplink Shared Channel (PUSCH) and a Physical Uplink Control Channel (PUCCH).

In an example embodiment and mode the receiver comprises a base station comprising multiple receive antennas which operates in accordance with multiple-input, multiple-output (MIMO) technology.

In an example embodiment and mode circuitry is used to perform acts of the method.

In another of its aspects the technology disclosed herein concerns a receiver that performs symbol detection. In an example embodiment the receiver comprises a plurality of receive antennas and electronic circuitry. The plurality of receive antennas are configured to receive, over a radio channel, a frequency-domain received signal that comprises contribution from a block of time-domain symbols transmitted from one or more transmit antennas. The electronic circuitry is configured or otherwise operable to generate a transformation matrix and a triangular matrix based on a frequency domain channel response of the radio channel; transform the received frequency-domain signal to obtain a transformed frequency-domain signal; perform detection of the time-domain symbols using a multi-stage detection procedure in which each detection stage uses elements of the transformed frequency-domain signal associated with that detection stage. For performing the multi-stage detection procedure the electronic circuitry is configured in a first stage, to form hypotheses for the first detection stage based on possible modulation values of one of the time-domain symbols, to evaluate detection metrics for all the hypotheses formed for the first detection stage, and to retain a predetermined number of best hypotheses from the first detection stage; in an intermediate detection stage, to jointly detect a number of time-domain symbols, the detected time-domain symbols including all the time-domain symbols that were jointly detected in the immediately preceding stage and an additional time-domain symbol that was not detected in any of the previous stages, to form joint hypotheses for the intermediate stage based on possible modulation values used by the additional time-domain symbol and the retained joint hypotheses for the time-domain symbols that were jointly detected in the immediately preceding stage, and to evaluate detection metrics for all the hypotheses formed for the intermediate stage, and retaining a predetermined number of best hypotheses from the intermediated stage; and, in a last detection stage, to jointly detect all the time-domain symbols.

In an example embodiment the receiver comprises a communication interface; a factorization unit; a transformer; and, a multi-stage detector. The communication interface is configured to receive, over the radio interface, a frequency-domain received signal that comprises contribution from a block of time-domain symbols transmitted from one or more transmit antennas. The factorization unit is configured to generate the transformation matrix and the triangular matrix based on a frequency domain channel response. The transformer is configured to transform the received frequency-domain signal to obtain the transformed frequency-domain signal. The multi-stage symbol detector is configured to perform plural stages of joint detection, each detection stage using elements of the filtered frequency-domain signal associated with that detection.

The detector is configured in a first detection stage to form hypotheses for the first detection stage based on possible modulation values of one of the time-domain symbols; to evaluate detection metrics for all the hypotheses formed for the first detection stage; and to retain a predetermined number of best hypotheses from the first detection stage.

The detector is configured, in an intermediate detection stage, to jointly detect a number of time-domain symbols, the detected time-domain symbols including all the time-domain symbols that were jointly detected in the immediately preceding stage and an additional time-domain symbol that was not detected in any of the previous stages. For the intermediate detection stage(s) the detector is configured to form joint hypotheses for the intermediate stage based on possible modulation values used by the additional time-domain symbol and the retained joint hypotheses for the time-domain symbols that were jointly detected in the immediately preceding stage; to evaluate detection metrics for all the hypotheses formed for the intermediate stage; and to retain a predetermined number of best hypotheses from the intermediated stage. The detector is configured in a last detection stage to jointly detect all the time-domain symbols.

In an example embodiment the dependent claim is further configured to generate filter coefficients based on impairment correlation properties of the frequency-domain received signal; and use the generated filter coefficients to filter the received frequency-domain signal prior to obtaining the transformed frequency-domain signal. In an example embodiment and mode, the electronic circuitry is configured to determine the filter coefficients based on impairment correlation properties of the frequency-domain received signal.

In an example embodiment the electronic circuitry is configured to factor a system matrix (e.g., a three matrix product) to obtain a transformation matrix and a triangular matrix; to use the transformation matrix and a filtered frequency-domain received signal to obtain a transformed frequency-domain received signal; and, for each stage of detection, to evaluate the detection metric using elements of the transformed frequency-domain received signal associated with the stage and elements of the triangular matrix associated with the stage. In an example implementation the system matrix product is a product of an inverse of the square root of an impairment covariance matrix of the frequency-domain received signal; an estimate of the channel response of the frequency-domain received signal; and a matrix used to perform frequency domain to time domain conversion of the symbols of the frequency-domain received signal.

In an example embodiment wherein time-domain symbols $s(0)$ through $s(K-1)$ comprise a block of symbols; for the first stage the one of the time-domain symbols is symbol $s(K-1)$; for the second stage the new time-domain symbol is symbol $s(K-2)$; and for a $g^{th}$ stage the new time-domain symbol is symbol $s(K-g)$.

In an example embodiment the receiver is a base station and wherein the communications interface comprising plural receive antennas and configured to receive the frequency-domain received signal on an uplink channel.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a diagrammatic view of portions of a telecommunications network according to an example embodiment.

FIG. 3 is a diagrammatic view of portions of a telecommunications network according to an example embodiment showing selected basic functionalities of a receiver.

DETAILED DESCRIPTION

Figure 2:
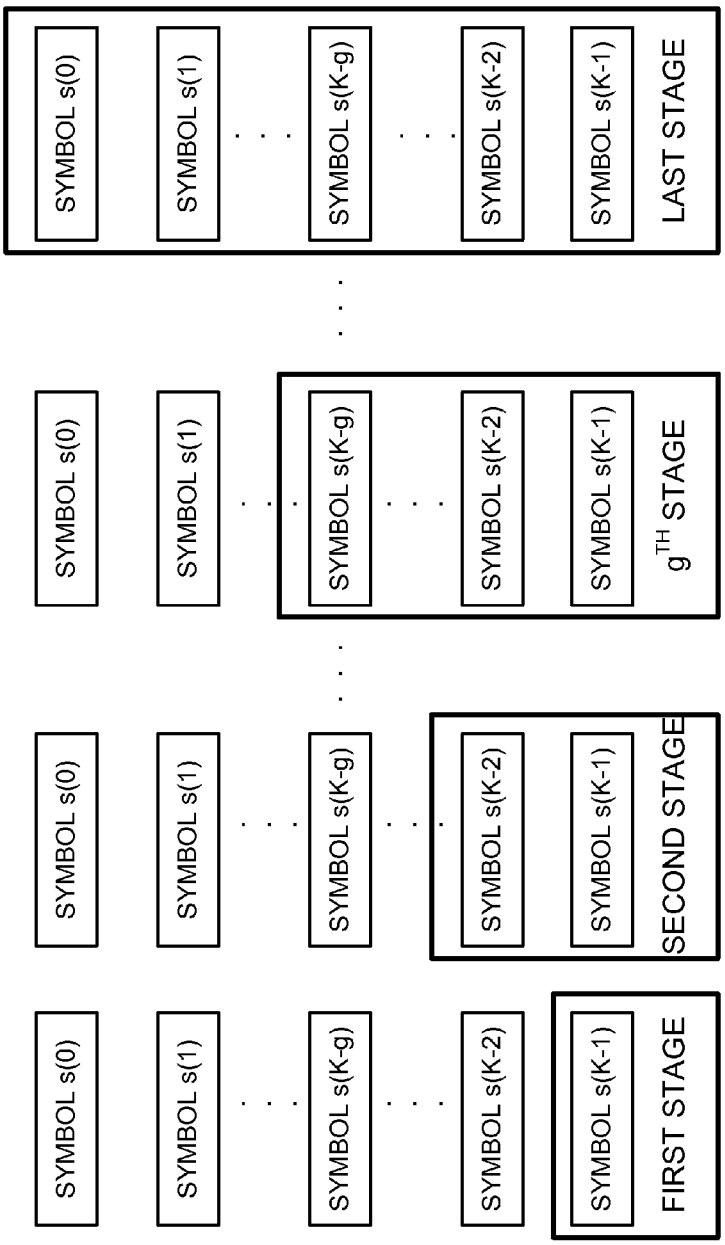
FIG. 2 is a diagrammatic view illustrating staged operation of a multi-stage symbol detector.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 1 shows portions of a telecommunications network 20, and particularly a telecommunications network 20 comprising a transmitter 28 which communicates over a channel 29, e.g., an air interface, with a wireless receiver 30. The transmitter 28 is of a type that modulates a block of symbols onto plural radio frequency subcarriers for transmission as a signal over the channel 29. As explained in more detail subsequently, as part of its signal processing the receiver 30 performs a multi-stage symbol detection procedure. For all detection stages except a first stage, each detection stage of the multi-stage symbol detection procedure is incrementally inclusive by forming, evaluating, and retaining joint hypotheses for the respective detection stage based on possible modulation values used by an additional time-domain symbol associated with the detection stage and retained joint hypotheses for time-domain symbols that were jointly detected in the previous detection stages. In view of this incrementally inclusive approach, the multi-stage symbol detection procedure is at times referenced herein as the incrementally inclusive multi-stage symbol detection procedure.

An example scenario of the incrementally inclusive nature of the multi-stage symbol detection procedure is illustrated in FIG. 2. In the particular example scenario of FIG. 2, the first detection stage of the incrementally inclusive multi-stage symbol detection procedure attempts to form, evaluate, and retain joint hypotheses based on possible modulation values for one time-domain symbol $s(K-1)$; the second detection stage makes similar attempts with respect to the retained hypotheses from the first detection stage and possible modulation values used by a new time-domain symbol $s(K-2)$ associated with the second detection stage; an intermediate ($g^{th}$) detection stage makes similar attempts with respect to the retained hypotheses from the previous ($g-1^{th}$ stage) and possible modulation values used by a new time-domain symbol $s(K-g)$ associated with the intermediate ($g^{th}$) detection stage; and so forth. The formation, evaluation, and retention of the joint hypotheses for each detection stage are described further herein.

The wireless receiver 30 described herein can be any device which receives transmissions over an air interface. In some example, non-limiting embodiments, the wireless receiver 30 may take the form of a radio base station node of a radio access network, which (in LTE parlance) may also have the name of an eNodeB or eNB. Moreover, in some example, non-limiting embodiments and modes the blocks described herein may comprise information transmitted on an uplink from a wireless device such as a user equipment unit (UE) to a base station node, and particularly information transmitted over an uplink channel such as, for example, at least one of a Physical Uplink Shared Channel (PUSCH) and a Physical Uplink Control Channel (PUCCH).

FIG. 3 shows basic functionalities of receiver according to an example embodiment. The receiver of FIG. 3 comprises communication interface 32 and signal processing section 34. In an example embodiment the signal processing section 34 may be realized by an electronic circuit or platform as herein described, e.g., with reference to FIG. 11. The electronic circuit serves as, e.g., or is comprised of, symbol detector 40. In the embodiment of FIG. 3 it is the symbol detector 40 of the signal processing section 34 which performs the incrementally inclusive multi-stage symbol detection procedure. As such, the detector 40, or the electronic circuitry serving as the same, is at times referenced herein as the incrementally inclusive multi-stage symbol detector.

Figure 4:
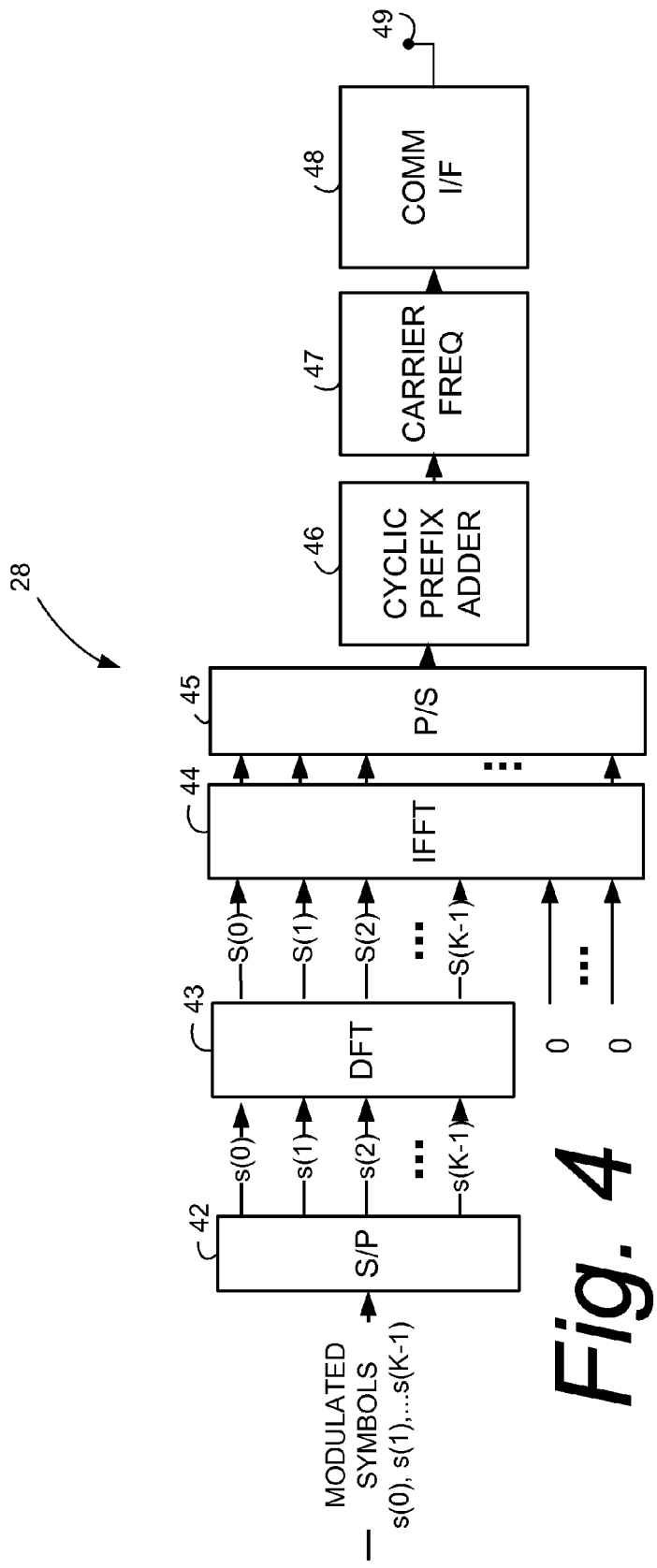
FIG. 4 is a schematic view of selected basic functionalities of a transmitter according to an example embodiment.

Advantages in performing the incrementally inclusive multi-stage symbol detection procedure are especially appreciated when viewed in light of the nature of the signal transmitted by transmitter 28 over the channel 29. FIG. 4 shows more details of an example transmitter 28 which is suitable use with Long Term Evolution (LTE). The FIG. 4 transmitter 28 comprises serial-to-parallel converter 42; discrete Fourier transformation section 43; modulation section 44; parallel-to-serial converter 45; cyclic prefix adder 46; carrier frequency shifter 47; and communication interface 48.

FIG. 4 further shows a serial stream of modulated time-domain symbols s(0), s(1), ... s(K−1) incoming to transmitter 28 being converted to parallel symbols s(0), s(1), ... s(K−1) by serial-to-parallel converter 42. The parallel time-domain symbols s(0), s(1), ... s(K−1) are applied to input ports of discrete Fourier transformation section 43 which performs a conversion to the frequency domain. For example, time-domain symbols s(0), s(1), ... , s(K−1) are precoded via a discrete Fourier transform (DFT) 43 to produce K number of frequency-domain symbols according to Expression 1.

$$S(k) = \frac{1}{\sqrt{K}} \sum_{i=0}^{K-1} s(i) e^{\frac{-j2\pi i k}{K}}, 0 \le k \le K-1 \quad \text{Expression 1}$$

$$S = Fs \quad \text{Expression 2}$$

Expression 2 above shows a vector representation of the frequency-domain symbols, time-domain symbols, and the DFT precoding process, where $S=(S(\mathbf{0}), S(\mathbf{1}), \ldots, S(K-1))^T$, $s=(s(\mathbf{0}), s(\mathbf{1}), \ldots, s(K-1))^T$, K is the size of the DFT, and the (k, i) component of matrix F is $$f_{ki} = \frac{e^{\frac{-j2\pi i k}{K}}}{\sqrt{K}}.$$

Herein it is assumed the symbol energy is normalized to have unity average symbol energy, $E[|s(k)|^2]=E[|S(k)|^2]=1$ Each of the time-domain symbols is generated according to a modulation scheme used by the transmitter 28. A modulation scheme can for example be QPSK, which has four constellation points, 16-QAM, which has 16 constellation points, or 64-QAM, which has 64 constellation points. The frequency-domain symbols S(0), S(1), ... S(K−1) output from discrete Fourier transform (DFT) 43 are applied to an Inverse Fast Fourier Transformer (IFFT) 44. Each frequency-domain symbol is modulated on a subcarrier allocated to the user of interest, as understood with reference to Expression 3.

$$x(t) = \sum_{k=0}^{K-1} S(k) e^{j2\pi(k-K_s)(t-t_{cp})\Delta f} \quad \text{Expression 3}$$

In Expression 3, K is the number subcarriers allocated to a user (e.g., the "user of interest"), $t_{cp}$ is the duration of the cyclic prefix, $K_s$ is a frequency offset used to shift the baseband signal to have a center frequency at D.C., and, $\Delta f=15$ kHz. Thus x(t) can be thought of as a periodic signal with period $1/\Delta f$; however the transmitted signal is truncated to have a duration of $t_{cp}+1/\Delta f$. The baseband time-continuous signal x(t) (with $K_S=0$) can be generated by first generating a discrete-time series of samples $x_n=x(n\Delta t)$ over one signal period, $1/\Delta f$. Here, the time interval between two discrete samples is $\Delta t=1/\Delta f/N$, where integer N is chosen to achieve accurate representation of the time-continuous baseband signal x(t) through the discrete-time series of samples $\{x_n\}_{n=0}^{N-1}$. With a sufficiently large value of N, x(t) can be accurately generated through passing $\{x_n\}_{n=0}^{N-1}$ to a digital to analog (D/A) filter. A computationally efficient method of generating $\{x_n\}_{n=0}^{N-1}$ is to perform an N-point IFFT operation on the frequency-domain symbols S(0), S(1), ... S(K−1). Typically, N>K, and in such cases S(k) is set to zero for k≥K, as illustrated in FIG. 4.

The outputs of IFFT 44 are then applied to parallel-to-serial (P/S) converter 45, which outputs the discrete-time series of samples $\{x_n\}_{n=0}^{N-1}$ to cyclic prefix adder 46. The stream with inserted cyclic prefix is shifted to appropriate subcarrier frequency(ies) by carrier frequency shifter 47. That is, the carrier frequency shifter 47 shifts the baseband signal to a subcarrier frequency according to the band for the operation, and then to communication interface 48. As shown in FIG. 4, the communication interface 48 may comprise transmit antenna 49. In another embodiment, the entire transmitter 28 can be duplicated to support transmitting an additional stream or layer of data for a MIMO transmission, for example.

The transmitter 28 thus originally received K symbols in time domain, but through, e.g., the DFT process, each frequency-domain symbol which is transmitted over the channel 29 becomes a function of these K symbols. In time dispersion over the channel 29 these K time domain symbols may mingle together or interfere with each other to cause the inter-symbol interference (ISI) phenomena earlier mentioned.

The receiver 30 receives a received signal of duration $t_{cp}+1/\Delta f$ that includes a block of K number of symbols of interest which is referred to as a symbol block or "block". In view of the inter-symbol interference (ISI), the receiver 30 advantageously performs joint detection of symbols in the block. The number K can be quite large, e.g., K=300 or so with a 5 MHz bandwidth allocation for a non-MIMO application, and can be much larger for a MIMO application. For example, if each time-domain symbol uses 16-QAM modulation, this involves evaluating $16^{300}$ joint hypotheses and detect the one joint hypothesis that has the best metric. Therefore, the detector 40 of receiver 30 of the technology disclosed herein advantageously performs the incrementally inclusive multi-stage symbol detection procedure and divides the joint detection process into a number of detection stages. Complexity reduction is also achieved by limiting the joint hypotheses to the ones which have survived the pruning process in the previous detection stage. More details on the pruning process are given below.

Figure 5:
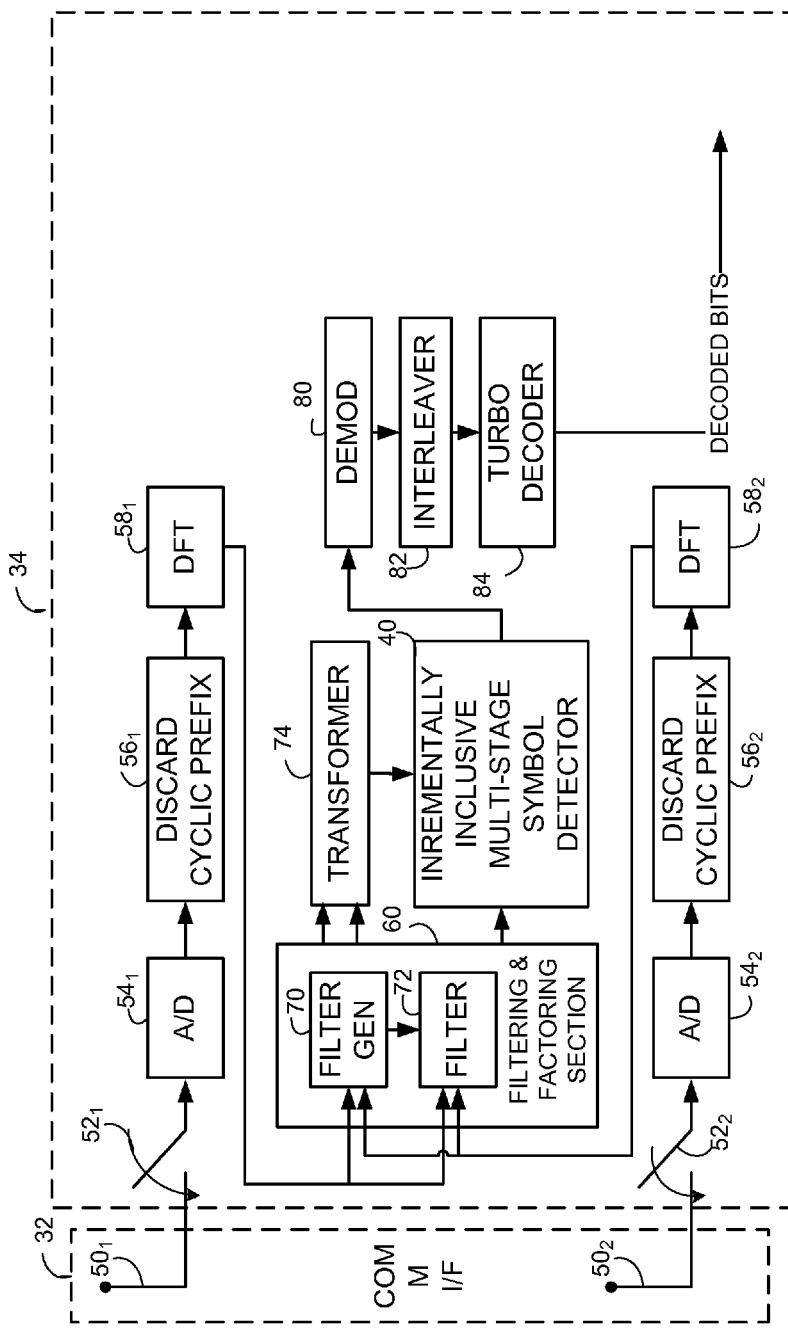
FIG. 5 is a schematic view of selected basic functionalities of a receiver according to an example embodiment.

FIG. 5 shows, in more detail, an example embodiment of receiver 30 which includes symbol detector 40 configured to address the problem of inter-symbol interference (ISI) by joint detection of symbols on a multi-stage basis. FIG. 5 shows communication interface 32 as comprising plural receive antennas 50 which receive time-domain signal waveforms on the subcarriers transmitted by transmitter 28. The FIG. 5 embodiment particularly shows two receive antennas 50₁ and 50₂, but it should be understood that a greater number of receive antennas may be employed. The waveforms as received by the receive antennas 50₁ and 50₂ are applied to respective front end processing branches of signal processing section 34. Each front end processing branch comprises signal sampler 52; analog to digital converter (ADC) 54; cyclic prefix discard mechanism 56; and discrete Fourier transform (DFT) or fast Fourier transform (FFT) 58. It should be appreciated that the number of front end processing branches of signal processing section 34 corresponds to the number of receive antennas 50, so that should a greater number of receive antennas be employed (e.g., four), a corresponding greater number of front end processing channels (e.g., four) are included in signal processing section 34.

Figure 6:
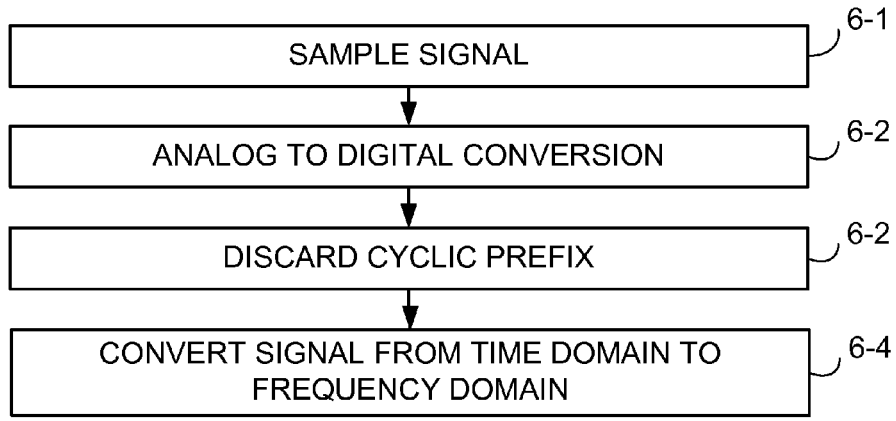
FIG. 6 is a flowchart showing basic, representative acts or steps performed by a front end processing section of a receiver in an example mode.

Basic acts encompassed by operation of portions of the front end processing branches of the signal processing section are depicted by FIG. 6. Act 6-1 of FIG. 6 shows the waveforms as received by the receive antennas $50_1$ and $50_2$ as being sampled by respective signal samplers $52_1$ and $52_2$, so that the values corresponding to the sampled discrete points of the waveform are applied to respective analog to digital converters (ADC) $54_1$ and $54_2$. Act 6-2 comprises the sampled discrete points of the waveform being converted from analog to digital by converters (ADC) $54_1$ and $54_2$. As act 6-3 the sampled points corresponding to the cyclic prefix (which was applied by cyclic prefix adder 46 of transmitter 28) are removed by respective cyclic prefix discard mechanisms $56_1$ and $56_2$. Thereafter the discrete-time series of the time-domain signal being processed by each branch of the signal processing section 34 is applied to respective Discrete Fourier transform [DFT] (or Fast Fourier transform [FFT]) $58_1$ and $58_2$ so that (as act 6-4) the time-domain received signals are converted to the frequency domain. The size of Discrete Fourier transform (or Fast Fourier transform), denoted as N, used by $58_1$ and $58_2$ is determined by the number of samples after discarding the cyclic prefix. Typically, N≥K. Recall that K is the number of subcarriers allocated to the user of interest. Thus, the output ports of $58_1$ and $58_2$ may contain subcarrier signals outside of the frequency allocation of the user of interest. In such cases, those subcarriers outside of the frequency allocation are discarded. Thereafter the frequency-domain received signal corresponding to the K subcarriers allocated to the user of interest from each front end processing branch of signal processing section 34 are applied both to filtering and factorization section 60. The filtering and factorization section 60 comprises, e.g., filter 70 and filter generator 72. The received signal from multiple antennas are filtered jointly in the same filter (e.g., filter 72). The filtering and factorization section 60 generates a filtered frequency domain received signal Y'; a "Q matrix" (also known as "transformation matrix" or "unitary matrix"); an upper triangular matrix R; and vector $R_U^{-1/2}$. The Q matrix and the filtered frequency-domain received signal are applied to transformer 74. Transformer 74 transforms the filtered frequency-domain received signal to generate a transformed frequency-domain received signal T which is applied to symbol detector 40. The detector 40 also receives the upper triangular matrix R.

Stating some of the foregoing in a slightly different way, the filter 70 receives from the front end processing section the frequency-domain received signal for a particular user, i.e., the "user of interest". The frequency-domain received signal for the particular user is obtained from the K number of subcarriers that were actually allocated to the particular user for a particular time slot. The number of subcarriers N handled by the DFT (or FFT) $58_1$ and $58_2$ may be larger than the K number of subcarriers allocated to the user, e.g., may span a bandwidth wider than the bandwidth that is allocated to a user. But the K number of subcarriers provided to the symbol detector 40 comprises the set of subcarriers which were actually allocated to the particular user (user of interest) for a scheduled time period.

Assuming that the cyclic prefix is longer than the multipath delay spread, due to the periodicity of x(t) (see Expression 3), the frequency-domain (FD) received signal as received by filter 70 can be represented by Expression 4. In Expression 4, index k identifies signals at the kth frequency component (subcarrier), Y(k) is frequency-domain (FD) received signal; H(k) is the frequency response; and U(k) is the impairment component (e.g., noise). Here Y(k), H(k), and U(k) are represented as vectors to model the cases with multiple receive antennas, with each element in these vectors corresponding to one receive antenna. For example, the first element of Y(k) is taken from the $k^{th}$ element of the output of discrete Fourier transform (or fast Fourier transform) $58_1$, the second element of Y(k) is taken from the $k^{th}$ element of the output of discrete Fourier transform (or fast Fourier transform) $58_2$, and so on.

$$Y(k)=H(k)S(k)+U(k) \qquad \text{Expression 4}$$

As understood from Expression 4, the receiver antenna signals from multiple receive antennas 50 have already been processed together to form the vector Y(k). That is, the received frequency-domain signal is collected over multiple (e.g., all) subcarriers, so that the further elements of the receiver including symbol detector 40 has access to the total frequency-domain received signal Y. The collecting signals corresponding to the multiple subcarriers into vectors or matrices, e.g., $Y=(Y^T(0), Y^T(1), \ldots, Y^T(K-1))^T$, where K is the number of frequency subcarriers allocated to the user of interest, yields Expression 5.

$$Y=HS+U \qquad \text{Expression 5}$$

In Expression 5, H=diag(H(0), H(1), ..., H(K−1)), and $U=(U^T(0), U^T(1), \ldots, U^T(K-1))^T$. Recall that H is the frequency response and U is the impairment component. In the discussion below, a shorthand notation $\text{diag}_{k=0}^{K-1}(H(k))$ is used to represent the block-diagonal matrix diag(H(0), H(1), ..., H(K−1)).

Replacing frequency-domain (FD) symbols with time-domain (TD) symbols, the frequency-domain (FD) received signal can be expressed with time-domain symbols as Expression 6, which in turn can be rewritten as Expression 7.

$$Y = HFs + U \qquad \text{Expression 6}$$

$$Y = \sum_{k=0}^{K-1} a(k)s(k) + U \qquad \text{Expression 7}$$

In Expression 7, a(k) is the $k^{th}$ column of matrix HF, which has the form of Expression 7A.

$$a(k)=(f_{0,k}H^T(0), f_{1,k}H^T(1), \ldots, f_{K-1,k}H^T(K-1))^T \qquad \text{Expression 7A}$$

Expression 7A, i.e., a(k), can be thought of as the frequency-domain (FD) symbol waveform of s(k). The superscript "T" in Expression 7A (and other expressions herein) is the conventional notation for Transpose, while the superscript "H" in various expressions is the conventional notation for complex conjugant transpose. Use of vector and matrix representation makes it easier to describe certain signal processing acts mathematically.

The impairment component U is zero-mean and has a block diagonal impairment covariance as shown by Expression 8, in which $R_U(k)$ is as defined by Expression 9.

$$R_U=\text{diag}_{k=0}^{K-1}(R_U(k)), \qquad \text{Expression 8}$$

$$R_U(k)=E[U(k)U^H(k)]. \qquad \text{Expression 9}$$

The filter generator 70 is configured to generate a filter coefficient based on impairment correlation properties. The filter 72 is configured to use the filter coefficient to filter the frequency-domain received signal to obtain a filtered frequency-domain received signal. The transformer 74 is configured to use the transformation matrix (also known as the Q matrix or unitary matrix) to transform the filtered received frequency-domain signal to obtain a transformed frequency-domain received signal T. The transformed frequency-domain received signal T is applied to the incrementally inclusive multi-stage symbol detector 40.

Figure 7:
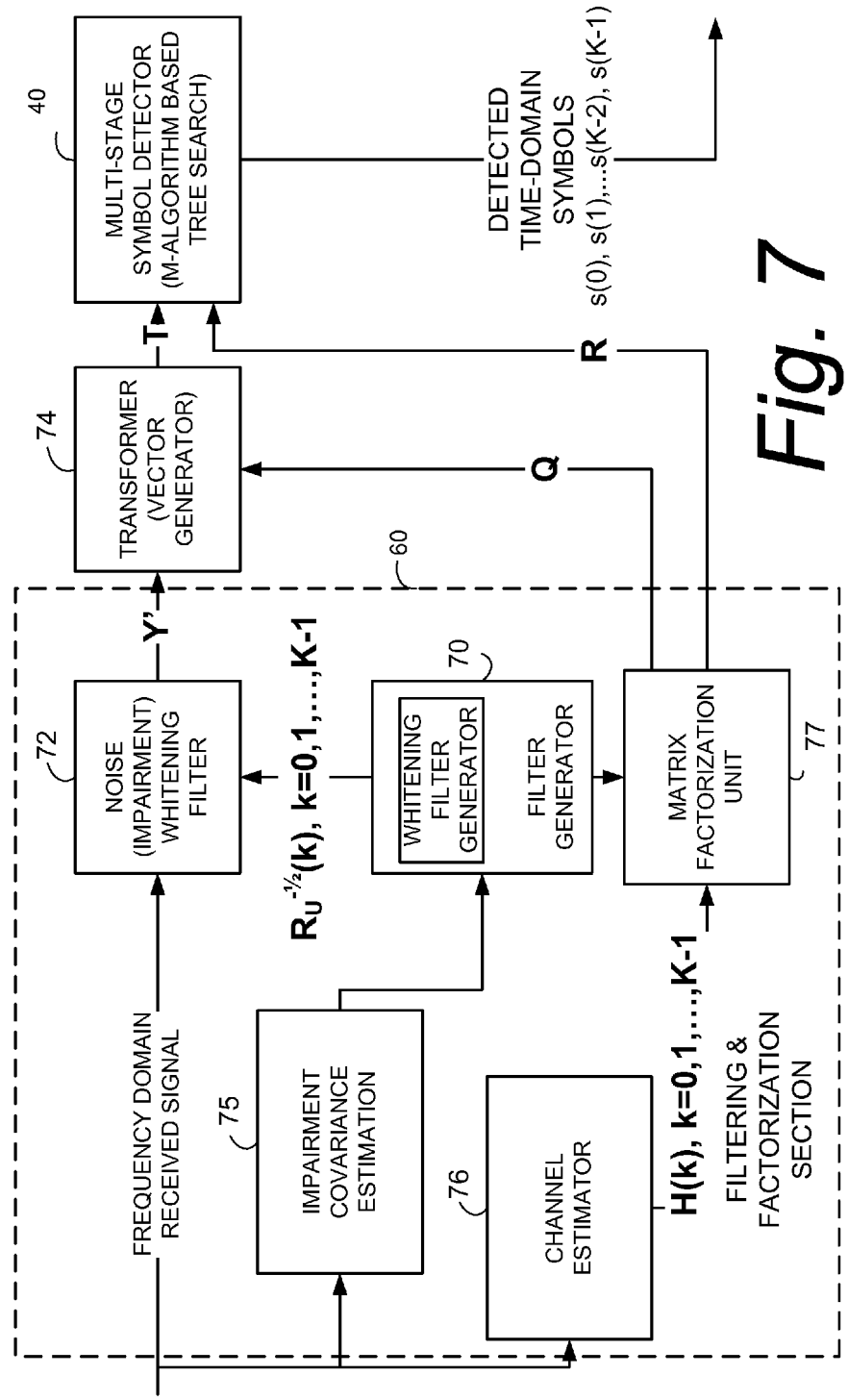
FIG. 7 is a schematic view showing an incrementally inclusive multi-stage symbol detector and various portions of a front end processing section preceding the detector.

FIG. 7 shows in more detail various portions of the front end processing section 34 which precede incrementally inclusive multi-stage symbol detector 40 as well as incrementally inclusive multi-stage symbol detector 40. As shown in FIG. 7, the frequency domain received signal (from discrete Fourier transform (DFT) 58) is applied to filter 72, to impairment covariance estimator 75, and to channel estimator 76. The impairment covariance estimator 75 outputs an impairment covariance estimation which is applied to filter generator 70 and to matrix factorization unit 77. The filter generator 70 generates a vector $R_U^{-1/2}$ which is an inverse square root of the impairment covariance matrix of the frequency domain received signal, which is used for coefficients of filter 72. In an example embodiment filter 72 is a whitening filter. The matrix factorization unit 77 receives the inverse square root of the impairment covariance matrix $R_U^{-1/2}$ as well as a channel estimation H (an estimate of the channel response of the frequency domain received signal) output by channel estimator 76 and an FFT matrix F that is used to perform frequency domain to time domain conversion of the symbols of the frequency domain received signal. The matrix factorization unit 77 factors system matrix $R_U^{-1/2}HF$, which is a product of three matrices, into factored matrices Q and R. Matrices Q and R can be obtained, for example, through a Gram-Schmidt serial projection and orthogonalization process. Note that the system matrix relates the signal at the output of filter 72 to the original time domain symbols. The matrix Q, also known as an orthonormal or orthogonal matrix, is applied to transformer 74. As such, matrix Q can be referred to as a transformation matrix. The matrix R, also known as a right triangular matrix, is applied to incrementally inclusive multi-stage symbol detector 40. The transformer 74 uses the filtered (whitened) frequency domain received signal as output by filter 72 and the transformation matrix Q to generate a transformed frequency domain received signal T. The matrix R is a new system matrix for the signal at the output of filter 74. The matrix R relates the signal at the output of filter 74 to the original time domain symbols. As such, the signal (vector T) at the output of filter 74 can be described by a system matrix that has a form of a triangular matrix R. Both the transformed frequency domain received signal T and the right triangular matrix R are applied as inputs to incrementally inclusive multi-stage symbol detector 40.

Figure 7A:
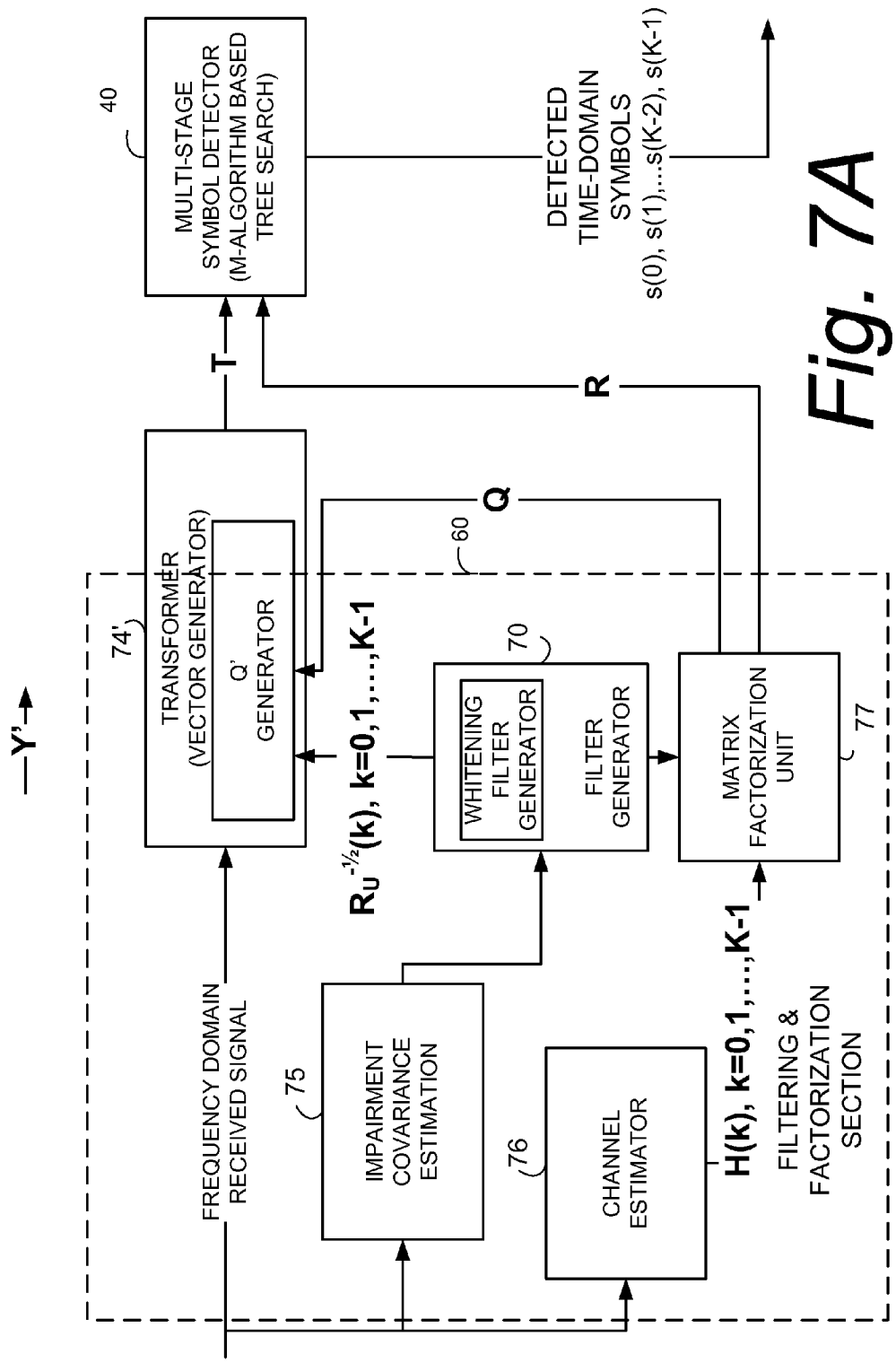
FIG. 7A is a schematic view showing another embodiment of an incrementally inclusive multi-stage symbol detector and various portions of a front end processing section preceding the detector.

FIG. 7A shows another embodiment which is a variation of FIG. 7. In the FIG. 7A embodiment a first set of filter coefficients $(R_U^{-1/2}(k))$ as output by filter generator 70 is applied to a transformer 74'. The transformer 74' combines the first set of filter coefficients and the transformation matrix Q (as received from matrix factorization unit 77) to form a new transformation matrix Q'. The transformer 74' may use the new transformation matrix Q' to directly transform the original frequency-domain received signal to obtain the transformed frequency-domain received signal T.

Figure 8:
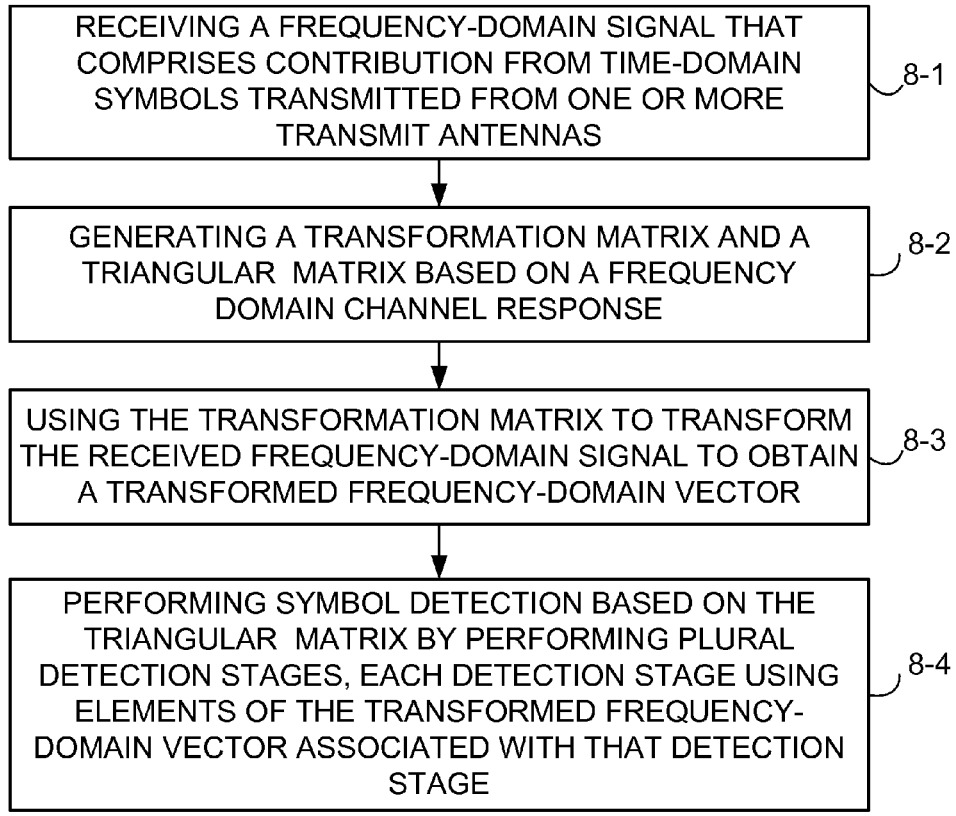
FIG. 8 is a flowchart showing basic, representative acts or steps performed by a multi-stage symbol detector in an example embodiment and mode.

Basic representative acts performed by other portions of the front end processing section as preparatory to symbol detector 40 are shown in FIG. 8. Act 8-1 comprises receiving a frequency-domain signal that comprises contribution from time-domain symbols transmitted from one or more transmit antennas. Act 8-2 comprises generating a transformation matrix Q and a triangular matrix R based on a frequency domain channel response H. Act 8-3 comprises using the transformation matrix Q to transform the received frequency-domain signal to obtain a transformed frequency-domain signal T. Act 8-4 comprises the symbol detector 40 performing symbol detection by performing plural stages of detection, each stage of detection using elements of the transformed frequency-domain received signal T associated with the stage.

Figure 8A:
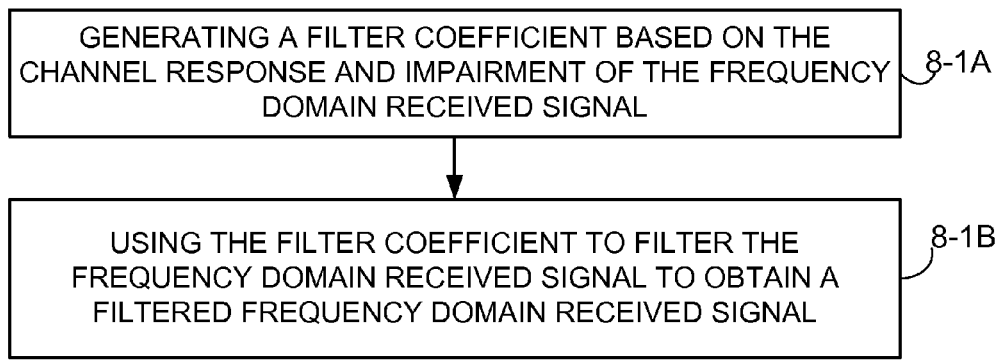
FIG. 8A is a flowchart showing additional basic, representative acts or steps performed by a multi-stage symbol detector in an example embodiment and mode.

FIG. 8A shows two acts that, in an example embodiment and mode, may comprise or be subsumed in act 8-1. Act 8-1A comprises the filter generator 70 generating a filter coefficient $(R_U^{-1/2}(k))$ based on the channel response and impairment of the frequency-domain received signal. Act 8-1B comprises the filter 72 using the filter coefficient to filter the frequency-domain received signal to obtain a filtered frequency-domain received signal Y'. Act 8-1B thus facilitates, e.g., act 8-3, which comprises the transformer 74 generating a transformed frequency-domain signal T describing the filtered frequency-domain signal Y'.

Thus as act 8-1A the filter generator 70 generates a whitening filter coefficient $(R_U^{-1/2}(k))$ which is sent to the filter 72. As mentioned above, in act 8-1B the frequency domain received signal Y is whitened by whitening filter 72. This whitening step can be applied on a subcarrier-by-subcarrier basis to the frequency domain received signal Y(k), k=0, 1, . . . , K−1, to yield a whitened or filter frequency domain received signal Y' as shown by Expression 10.

$$Y'(k)=R_U^{-1/2}(k)Y(k) \qquad \text{Expression 10}$$

In the filtering operation filter 72 configures its coefficients according to the coefficient $(R_U^{-1/2}(k))$ with which it is supplied by filter generator 70. The filtering operation performed by filter 72 is accomplished in the frequency domain, with k being the subcarrier index, and is applied for each subcarrier a matrix multiplication. In the time domain this is equivalent to a filtering operation. The multiplication performed by filter 72 in the frequency domain is equivalent to a time domain filtering, which is a reason why it is called a whitening filter.

Thus, as understood from the foregoing, in an example implementation, the method comprises determining the filter coefficients based on impairment correlation properties of the frequency-domain received signal, e.g., based on an impairment covariance matrix of the frequency-domain received signal.

The whitened frequency domain received signal Y' can be concatenated over all the subcarriers to obtain a total whitened FD received vector Y' as shown by Expression 11.

$$Y'=(Y'^T(0), Y'^T(1), \ldots, Y'^T(K-1))^T \qquad \text{Expression 11}$$

The whitened frequency domain received signal Y' can be described by a system matrix which is a three matrix product $R_U^{-1/2}HF$. The matrix factorization unit 77 factors such a system matrix or three matrix product $R_U^{-1/2}HF$ to obtain the unitary matrix Q and an upper triangular matrix R. As understood from FIG. 7 and the foregoing, the three matrix product $R_U^{-1/2}HF$ is a product of the inverse of the square root of an impairment covariance matrix of the frequency-domain received signal $(R_U^{-1/2})$; an estimate of the channel response of the frequency-domain received signal (H); and a matrix (F) used to perform frequency domain to time domain conversion of the symbols of the frequency-domain received signal. Thus, QR factorization is applied to the system matrix $R_U^{-1/2}HF$ by matrix factorization unit 77 so that $QR=R_U^{-1/2}HF$, where Q is an unitary matrix and R is an upper triangular matrix. Thus, Q and R are two matrices that result from factorization of the matrix $R_U^{-1/2}HF$ in such a manner that Q is a unitary matrix and R is an upper triangular matrix, and that the product of QR equals $R_U^{-1/2}HF$. By "unitary matrix" is meant that, if a matrix is multiplied by its transpose, the result is the identity matrix. By upper triangular matrix is meant that all elements below a matrix diagonal are zero. In the illustration of Expression 14, for example, all elements below the diagonal are zero, whereas elements in the upper right of the matrix are not necessarily zero (so that the matrix of Expression 14 is an upper right triangular matrix.

Act 8-3 comprises the transformer 74 generating a transformed frequency-domain signal T describing the filtered frequency-domain signal. In particular, in an example embodiment and mode the transformer 74 uses the unitary matrix Q and the filtered frequency-domain received signal Y' to obtain a transformed frequency-domain received signal T. Expression 12 reflects application by transformer 74 of the unitary matrix Q to the total whitened FD received vector Y'.

$$T=Q^H Y' \quad \text{Expression 12}$$

At this point Expression 13 is also applicable, which also has the form of Expression 14. In Expression 14, the vector at the left of the equality is the transformed frequency-domain received signal T; the first vector to the right of the equality is the upper right triangular matrix R; the second matrix to the right of the equality is a matrix s of the time-domain symbols of the received signal, and the last term to the right of the equality is the impairment component U'. Expressions 13 and 14 are new system equations relating the transformed frequency-domain received signal T to the transmitted time domain symbol vector s via the system matrix R.

$$T = Q^H Y' = Q^H R_U^{-1/2} HFs + U' = Rs + U', \quad \text{Expression 13}$$

$$\begin{bmatrix} t_0 \\ t_1 \\ \vdots \\ t_{K-2} \\ t_{K-1} \end{bmatrix} = \begin{bmatrix} r_{0,0} & r_{0,1} & \cdots & r_{0,K-2} & r_{0,K-1} \\ 0 & r_{11} & \ddots & r_{1,K-2} & r_{1,K-1} \\ \vdots & \ddots & \ddots & \ddots & \vdots \\ \vdots & \ddots & \ddots & r_{K-2,K-2} & r_{K-2,K-1} \\ 0 & 0 & \cdots & 0 & r_{K-1,K-1} \end{bmatrix} \quad \text{Expression 14}$$

$$\begin{bmatrix} s(0) \\ s(1) \\ \vdots \\ s(K-2) \\ s(K-1) \end{bmatrix} + \begin{bmatrix} u'_0 \\ u'_1 \\ \vdots \\ u'_{K-2} \\ u'_{K-1} \end{bmatrix}$$

In Expression 14, all the all-zero rows are omitted. The impairment component U' has an identity covariance matrix. Since R is an upper triangular matrix, joint detection of symbols in s can be done efficiently by applying the m-algorithm at incrementally inclusive multi-stage symbol detector 40, as described below. In an example embodiment and mode the symbol detection procedure as performed by symbol detector 40 utilizes an M-algorithm-based tree search.

Figure 9:
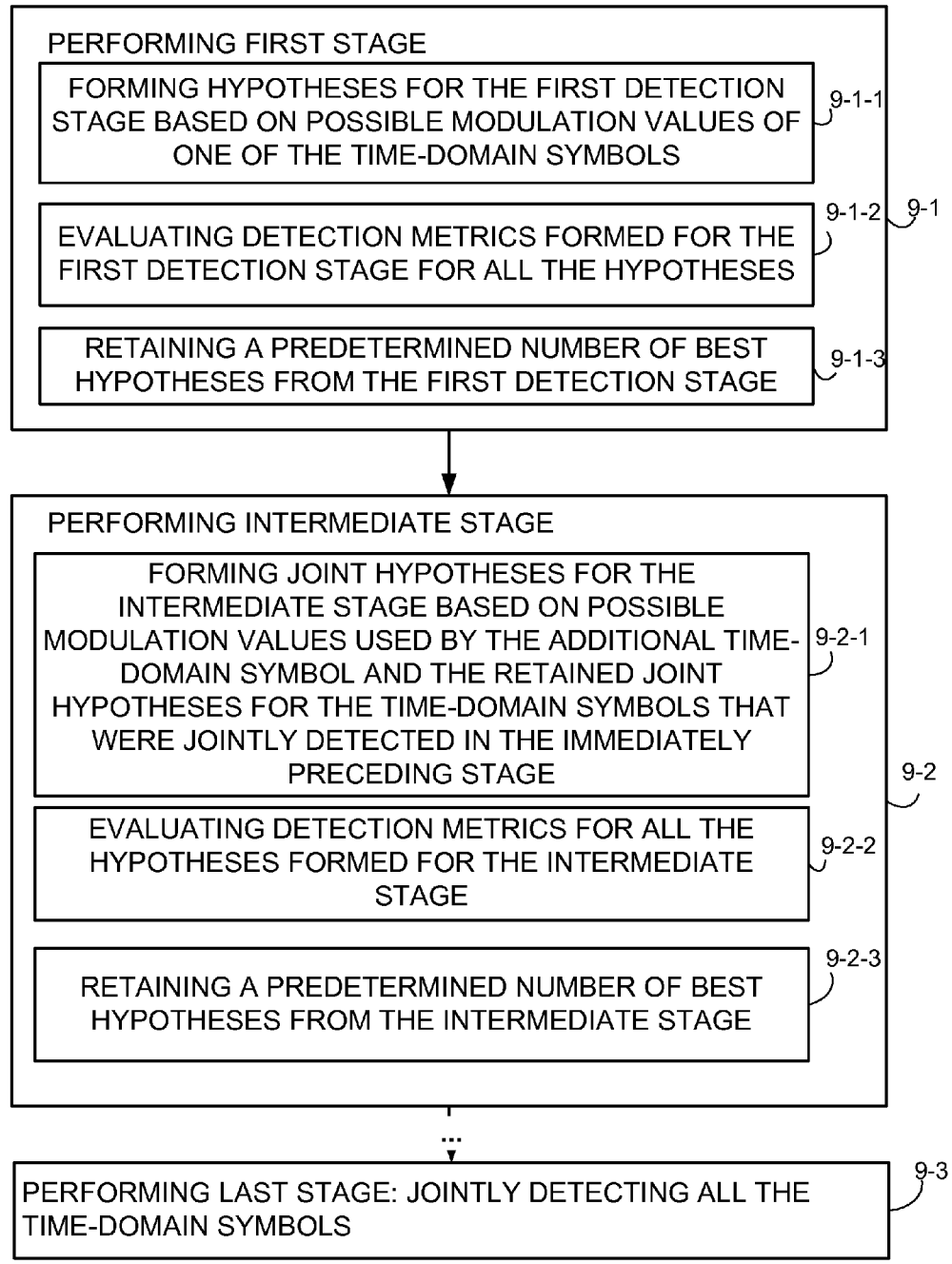
FIG. 9 is a flowchart showing basic, representative symbol detection acts or steps performed by a receiver in an example mode of performing a incrementally inclusive multi-stage symbol detection procedure.

The incrementally inclusive multi-stage symbol detection procedure as performed by symbol detector 40 comprises plural stages, including a first detection stage, one or more intermediate detection stages, and a last detection stage. The incrementally inclusive multi-stage symbol detector 40 is configured to perform plural stages of joint detection, each detection stage using elements of the filtered frequency-domain vector associated with that detection. FIG. 9 illustrates in more detail certain examples acts or steps comprising the multi-stage group detection procedure in an example embodiment and mode.

Entering the first detection stage is represented by act 9-1. For the first detection stage the symbol detection procedure comprises acts 9-1-1 through 9-1-3. Act 9-1-1 comprises forming hypotheses for the first detection stage based on possible modulation values of one of the time-domain symbols. Act 9-1-2 comprises evaluating detection metrics formed for the first detection stage for all the hypotheses. Act 9-1-3 comprises, in accordance with evaluation of the detection metrics, retaining a predetermined number of best hypotheses from the first detection stage.

In the first detection stage of the m-algorithm approach implemented by detector 40, the m most likely hypotheses for s(K−1) are determined based on minimizing metric of Expression 15.

$$\alpha_{K-1}(s(K-1))=|t_{K-1}-r_{K-1,K-1}s(K-1)|^2 \quad \text{Expression 15}$$

Entering an intermediate detection stage is represented by act 9-2. In essence, an intermediate detection stage comprises jointly detecting a number of time-domain symbols including an additional time-domain symbol that was not detected in any of the previous stages and all the time-domain symbols that were jointly detected in the previous stages. In particular, for the intermediate detection stage(s) the method comprises acts 9-2-1 through 9-2-3. Act 9-2-1 comprises forming joint hypotheses for the intermediate stage based on possible modulation values used by the additional time-domain symbol and the retained joint hypotheses for the time-domain symbols that were jointly detected in the immediately preceding stage. Act 9-2-2 comprises evaluating detection metrics for all the hypotheses formed for the intermediate stage. Act 9-2-3 comprises retaining a predetermined number of best hypotheses from the intermediate stage.

At a second detection stage (which is an example of an intermediate detection stage) each of these m surviving hypotheses of s(K−1) are expanded to include the Q hypothesis (where Q is the size of constellation) of s(K−2). For the second detection stage, the metrics in the form of Expression 16 is evaluated. Overall, there are Q×m metrics that are evaluated at each detection stage. At the end of the second detection stage, m surviving hypotheses for symbols (s(K−2), s(K−1)) are kept.

$$\alpha_{K-2}(s(K-2), s(K-1)) = \quad \text{Expression 16}$$

$$\alpha_{K-1}(s(K-1)) + \left| t_{K-2} - \sum_{k=K-2}^{K-1} r_{k-2,k} s(k) \right|^2$$

The operation of further intermediate stages beyond the second detection stage is understood from the foregoing explanation of the second stage and the decision metric for such further intermediate stages can be deduced from Expression 16.

This process continues until the last detection stage is reached. The last detection stage is represented by act 9-3, which essentially comprises ultimately jointly detecting all the time-domain symbols. In the last detection stage each of the m surviving hypothesis of (s(1), s(2), . . . , s(K−1)) are expanded to include Q hypothesis of s(0), and the most likely symbol combination over all the symbols in vector s=(s(0), s(1), . . . , s(K−1)) is chosen from Q×m joint hypothesis based on the metrics in the form of Expression 17. The corresponding symbols in the chosen combination are then treated as the detected symbols.

$$\alpha_0(s(0), s(1), \ldots, s(K-1)) = \quad \text{Expression 17}$$

$$\alpha_1(s(1), \ldots, s(K-1)) + \left| t_0 - \sum_{k=0}^{K-1} r_{0,k} s(k) \right|^2$$

For any of the detection stages of the incrementally inclusive multi-stage symbol detection procedure, what is meant by "best" hypotheses to be retained, as determined by evaluation of a decision metric, depends on the manner in which the detection metric is expressed. In some versions the detection metric may be expressed as a negative version (i.e., the detection metric is no greater than zero), in which case the best joint hypothesis with the best detection metric is that which has a maximum value. In other versions, the detection metric may be expressed as a positive version (i.e. the detection metric is no less than zero), in which case the best joint hypothesis with the best detection metric is that which has a minimum value.

Figure 10:
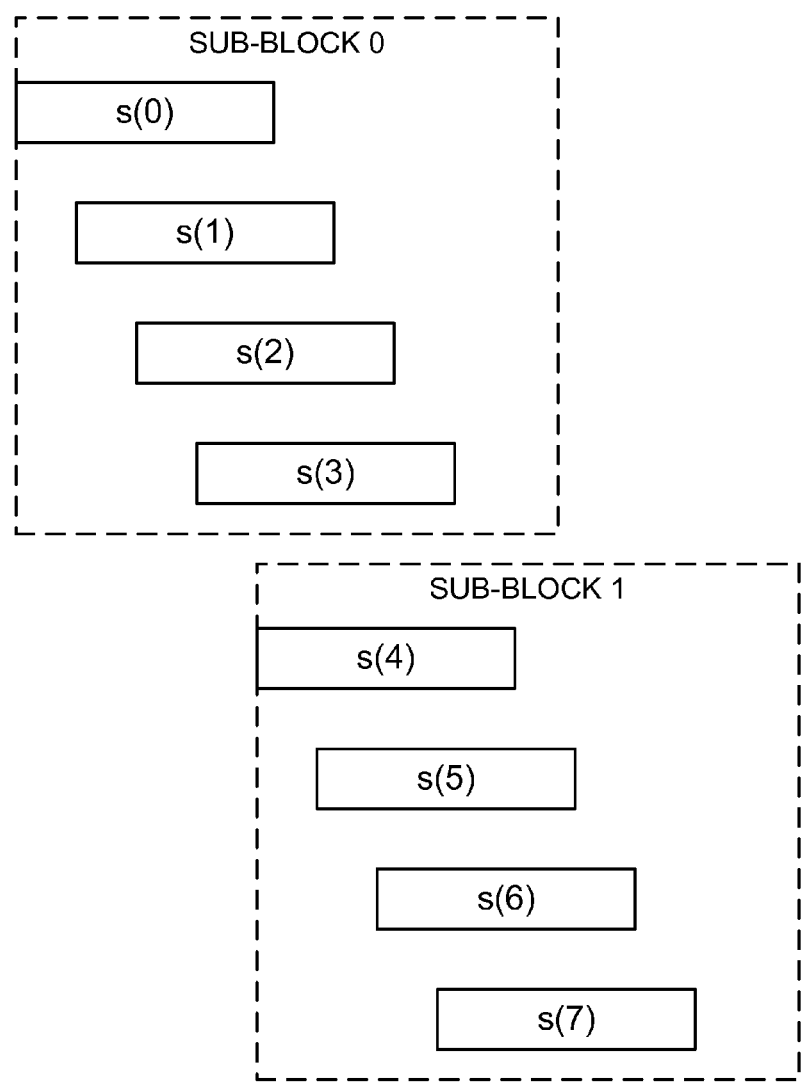
FIG. 10 is a diagrammatic view depicting an example embodiment and mode wherein an incrementally inclusive multi-stage symbol detection procedure operates on a sub-block-by-sub-block basis.

Yet in another example embodiment and mode, the time-domain symbols which are jointly detected by the incrementally inclusive multi-stage symbol detection procedure and the incrementally inclusive multi-stage symbol detector 40 are symbols which comprise a same sub-block. That is, in an example embodiment and mode the incrementally inclusive multi-stage symbol detection procedure can operate on a sub-block-by-sub-block basis, in the manner illustrated in FIG. 10, for example. In other words, a first execution of the incrementally inclusive multi-stage symbol detection procedure may involve only sub-block 0 of FIG. 10 and thus the joint detection of s(0) through S(3), and a second execution of the incrementally inclusive multi-stage symbol detection procedure may involve only sub-block 1 of FIG. 10 and thus the joint detection of s(4) through S(7). Such symbol detection on a sub-block basis is further understood from U.S. patent application Ser. No. 13/050,210, filed on Mar. 17, 2011, entitled "SYMBOL DETECTION FOR ALLEVIATING INTER-SYMBOL INTERFERENCE", which is incorporated herein by reference in its entirety The signal model of Expression 6 is also applicable to a multiple input, multiple output (MIMO) environment wherein multiple antennas may be used both at a transmitter and a receiver, such as occurs in 3GPP Long Term Evolution (LTE), for example. The general receiver operation as described herein (such as that illustrated with reference to FIG. 7) also applies to the MIMO environment. But in an MIMO environment matrices H and F and vector s of Expression 6 have slightly different forms. In this regard, let L be the number of MIMO layers, then matrices H and F, and vector s respectively become $\bar{H}$ and $\bar{F}$, and $\bar{s}$, which have the following forms understood with reference to the following respective expressions (where superscripts are used to index the MIMO layer): Expression 18, Expression 19, and Expression 20.

$$\bar{s} = \begin{bmatrix} s_0 \\ s_1 \\ \vdots \\ s_{K-2} \\ s_{K-1} \end{bmatrix}, s_k = \begin{bmatrix} s^0(k) \\ s^1(k) \\ \vdots \\ s^{L-1}(k) \end{bmatrix} \quad \text{Expression 18}$$

$$\bar{H} = \text{diag}(H(0), H(1), \ldots, H(K-1)) \quad \text{Expression 19}$$

$$\bar{F} = F \otimes I_{L \times L} \quad \text{Expression 20}$$

$$= \begin{bmatrix} F_{0,0} & F_{0,1} & \cdots & F_{0,K-2} & F_{0,K-1} \\ F_{1,0} & F_{1,1} & \ddots & F_{1,K-2} & F_{1,K-1} \\ \vdots & \ddots & \ddots & \ddots & \vdots \\ \vdots & \ddots & \ddots & F_{K-2,K-2} & F_{K-2,K-1} \\ F_{K-1,0} & F_{K-1,1} & \cdots & F_{K-1,K-2} & F_{K-1,K-1} \end{bmatrix}$$

In Expression 19, the ij element of H(k) is the frequency response of the channel from transmit antenna (layer) j to receive antenna i at the kth subcarrier. In Expression 20 the $F_{i,j} = f_{i,j} I_{L \times L}$ and $\otimes$ denotes the Kronecker product.

Thus, for any system scenario, if the system equation can be written in the form of Expression 6 or Expression 7, then an M-algorithm-based tree search can be implemented using the incrementally inclusive multi-stage symbol detection procedure as described herein.

Figure 11:
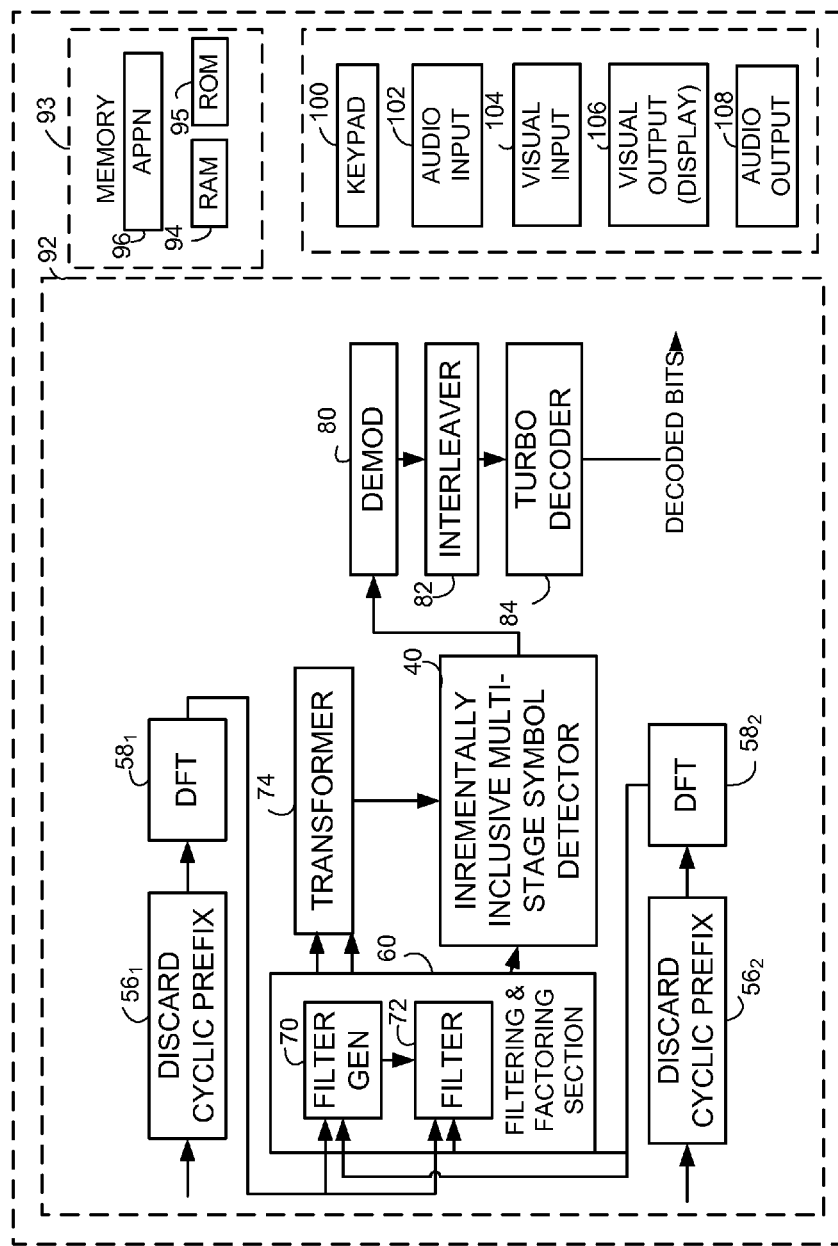
FIG. 11 is a schematic view of selected basic functionalities of a receiver according to an example, machine-implemented embodiment.

FIG. 11 illustrates a non-exhaustive and non-limiting example embodiment of a receiver in which various functional units are provided on a platform 90, the platform 90 being framed by broken lines in FIG. 11. The terminology "platform" is a way of describing how the functional units of receiver 30 can be implemented or realized by machine including electronic circuitry, including the electronic circuitry herein previously described. One example platform 90 is a computer implementation wherein one or more of the framed elements, including symbol detector 40, are realized by one or more processors 92 which execute coded instructions and which use non-transitory signals in order to perform the various acts described herein. In such a computer implementation the receiver 30 can comprise, in addition to a processor(s), memory section 93 (which in turn can comprise random access memory 94; read only memory 95; application memory 96 (which stores, e.g., coded instructions which can be executed by the processor to perform acts described herein); and any other memory such as cache memory, for example.

Typically the platform 90 of receiver 30 also comprises other input/output units or functionalities, some of which are illustrated in FIG. 11, such as keypad 100; audio input device 102 (e.g. microphone); visual input device 104 (e.g., camera); visual output device 106; and audio output device 108 (e.g., speaker). Other types of input/output devices can also be connected to or comprise receiver 30.

In the example of FIG. 11 the platform 90 has been illustrated as computer-implemented or computer-based platforms. Another example platform suitable for base 30 and/or symbol detector 40 in particular is that of a hardware circuit, e.g., an application specific integrated circuit (ASIC) wherein circuit elements are structured and operated to perform the various acts described herein.

Figure 12:
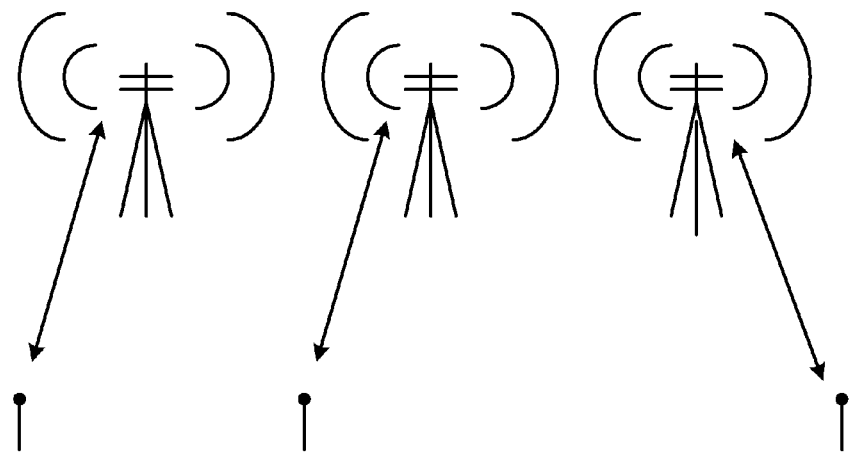
FIG. 12 is a diagrammatic view of portions of a Long Term Evolution (LTE) telecommunications network according to an example embodiment.

Although the described solutions may be implemented in any appropriate type of telecommunication system supporting any suitable communication standards and using any suitable components, particular embodiments of the described solutions may be implemented in a Long Term Evolution (LTE) network, such as that basically illustrated in FIG. 12. As shown in FIG. 12, the example network may include one or more instances of wireless terminals or user equipment (UEs) and one or more base stations capable of communicating with these UEs, along with any additional elements suitable to support communication between UEs or between a UE and another communication device (such as a landline telephone). Although the illustrated UEs may represent communication devices that include any suitable combination of hardware and/or software, these UEs may, in particular embodiments, represent devices such as the example UE illustrated in greater detail by FIG. 13. Similarly, although the illustrated base stations may represent network nodes that include any suitable combination of hardware and/or software, these base stations may, in particular embodiments, represent devices such as the example base station illustrated in greater detail by FIG. 14.

Figure 13:
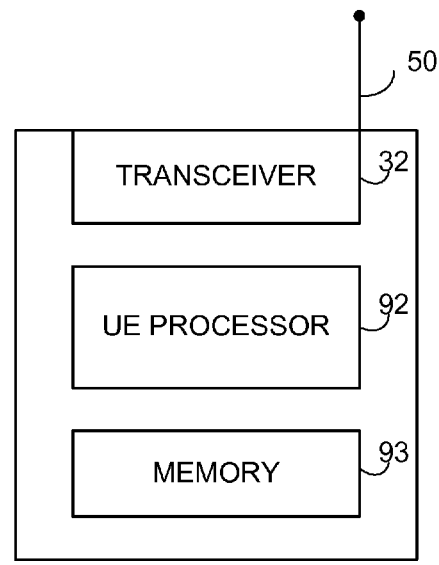
FIG. 13 is a diagrammatic view of portions of a user equipment unit (UE) served by a Long Term Evolution (LTE) telecommunications network according to an example embodiment.

As shown in FIG. 13, the example UE includes a processor 92, a memory 93, a transceiver 32, and an antenna 50. In particular embodiments, some or all of the steps in the uplink transmission techniques described above may be performed by the UE processor executing instructions stored on a computer-readable medium, such as the memory shown in FIG. 13. Alternative embodiments of the UE may include additional components beyond those shown in FIG. 13 that may be responsible for providing certain aspects of the UE's functionality, including any of the functionality described above and/or any functionality necessary to support the solution described above.

Figure 14:
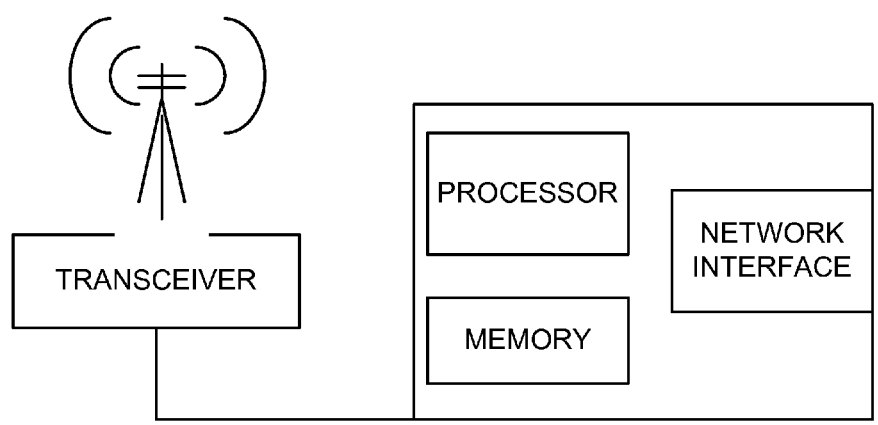
FIG. 14 is a diagrammatic view of portions of a base station node which comprises a Long Term Evolution (LTE) telecommunications network according to an example embodiment.

As shown in FIG. 14, the example base station includes a processor, a memory, a transceiver, and an antenna. In particular embodiments, some or all of the steps in the equalization techniques described above may be performed by the base station processor executing instructions stored on a computer-readable medium, such as the memory shown in FIG. 14. Alternative embodiments of the base station may include additional components responsible for providing additional functionality, including any of the functionality identified above and/or any functionality necessary to support the solution described above.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a receiver which receives a signal over a radio interface, comprising of:
   (1) receiving, over a radio channel, a frequency-domain signal that comprises contribution from time-domain symbols transmitted from one or more transmit antennas;
   (2) generating a transformation matrix and a triangular matrix based on a frequency domain channel response of the radio channel;
   (3) using the transformation matrix to transform the received frequency-domain signal to obtain a transformed frequency-domain signal;
   (4) performing symbol detection based on the triangular matrix by performing plural detection stages, each detection stage using elements of the transformed frequency-domain signal associated with that detection stage, the plural detection stages comprising:
   (4a) in a first detection stage:
   forming hypotheses for the first detection stage based on possible modulation values of one of the time-domain symbols,
   evaluating detection metrics for all the hypotheses formed for the first detection stage, and
   in accordance with the evaluation of the detection metrics, retaining a predetermined number of best hypotheses from the first detection stage,
   (4b) in an intermediate detection stage:
   jointly detecting a number of time-domain symbols, the detected time-domain symbols including all the time-domain symbols that were jointly detected in an immediately preceding stage and an additional time-domain symbol that was not detected in any previous stages;
   forming joint hypotheses for the intermediate stage based on possible modulation values used by the additional time-domain symbol and retained joint hypotheses for the time-domain symbols that were jointly detected in the immediately preceding stage;
   evaluating detection metrics for all the hypotheses formed for the intermediate stage, and
   in accordance with the evaluation of the detection metrics of said intermediate stage, retaining a predetermined number of best hypotheses from the intermediated stage
   (4c) in a last detection stage, jointly detecting all the time-domain symbols.

2. The method of claim 1, further comprising using a filter to filter the received frequency-domain signal prior to using the transformation matrix to obtain the transformed frequency-domain signal; and determining filter coefficients for the filter based on impairment correlation properties of the frequency-domain received signal.

3. The method of claim 2, further comprising determining the filter coefficients based on an impairment covariance matrix of the frequency-domain received signal.

4. The method of claim 1, further comprising:
factoring a three matrix product to obtain the transformation matrix and the triangular matrix, the three matrix product being a product of:
   an inverse of the square root of an impairment covariance matrix of the frequency-domain received signal;
   an estimate of the channel response of the frequency-domain received signal;
   a matrix used to perform frequency-domain to time domain conversion of the symbols of the frequency-domain received signal;
using the transformation matrix and a filtered frequency-domain received signal to obtain the transformed filtered frequency-domain received signal;
for each stage of detection, evaluating the detection metric using elements of the transformed filtered frequency-domain received signal associated with the stage and elements of the triangular matrix associated with the stage.

5. The method of claim 1, wherein act (2) comprises using impairment correlation properties of the frequency-domain received signal and/or a Fast Fourier Transformation matrix.

6. The method of claim 1, wherein symbols $s(0)$ through $s(K-1)$ comprise a block of symbols; wherein for the first stage the one of the time-domain symbols is symbol $s(K-1)$; wherein for the second stage the new time-domain symbol is symbol $s(K-2)$; and wherein for a $g^{th}$ stage the new time-domain symbol is symbol $s(K-g)$, where K and g are integers.

7. The method of claim 1, wherein acts (1) through (3) are performed to detect a first sub-block of symbols included in a block of symbols, and wherein the method further comprises repeating at least act (4) for another sub-block of the block of symbols.

8. The method of claim 1, wherein the receiver comprises a base station, and wherein the method further comprising receiving the frequency-domain received signal on an uplink channel.

9. The method of claim 8, wherein the uplink channel is at least one of a Physical Uplink Shared Channel (PUSCH) and a Physical Uplink Control Channel (PUCCH).

10. The method of claim 1, wherein the receiver comprises a base station comprising multiple receive antennas which operates in accordance with multiple-input, multiple-output (MIMO) technology.

11. The method of claim 1, further comprising using circuitry to perform the method.

12. A receiver comprising:
a plurality of receive antennas configured to receive, over a radio channel, a frequency-domain received signal that comprises contribution from a block of time-domain symbols transmitted from one or more transmit antennas;
electronic circuitry configured to:
generate a transformation matrix and a triangular matrix based on a frequency domain channel response of the radio channel;
transform the received frequency-domain signal to obtain a transformed frequency-domain signal;
perform detection of the time-domain symbols using a multi-stage detection procedure in which each detection stage uses elements of the transformed frequency-domain signal associated with that detection stage and in which the electronic circuitry is configured:
in a first stage, to form hypotheses for the first detection stage based on possible modulation values of one of the time-domain symbols, to evaluate detection metrics for all the hypotheses formed for the first detection stage, and to retain a predetermined number of best hypotheses from the first detection stage;
in an intermediate detection stage, to jointly detect a number of time-domain symbols, the detected time-domain symbols including all the time-domain symbols that were jointly detected in an immediately preceding stage and an additional time-domain symbol that was not detected in any previous stages, to form joint hypotheses for the intermediate stage based on possible modulation values used by the additional time-domain symbol and retained joint hypotheses for the time-domain symbols that were jointly detected in the immediately preceding stage, and to evaluate detection metrics for all the hypotheses formed for the intermediate stage, and retaining a predetermined number of best hypotheses from the intermediated stage; and
in a last detection stage, to jointly detect all the time-domain symbols.

13. The receiver of claim 12, wherein the electronic circuitry is further configured to:
generate filter coefficients based on impairment correlation properties of the frequency-domain received signal; and
use the generated filter coefficients to filter the received frequency-domain signal prior to obtaining the transformed frequency-domain signal.

14. The receiver of claim 13, wherein the electronic circuitry is further configured to determine the filter coefficients based on an impairment covariance matrix of the frequency-domain received signal.

15. The receiver of claim 12, wherein the electronic circuitry is further configured:
to factor a three matrix product to obtain the transformation matrix and the triangular matrix, the three matrix product being a product of:
an inverse of the square root of an impairment covariance matrix of the frequency-domain received signal;
an estimate of the channel response of the frequency-domain received signal;
a matrix used to perform frequency domain to time domain conversion of the symbols of the frequency-domain received signal;
to use the transformation matrix and the filtered frequency-domain received signal to obtain the transformed frequency-domain received signal; and
for each stage of detection, to evaluate the detection metric using elements of the transformed frequency-domain received signal associated with the stage and elements of the triangular matrix associated with the stage.

16. The receiver of claim 12, wherein the electronic circuitry is configured to transform the received frequency-domain signal to obtain the transformed frequency-domain signal by using impairment correlation properties of the frequency-domain received signal and/or a Fast Fourier Transformation matrix.

17. The receiver of claim 12, wherein symbols $s(0)$ through $s(K-1)$ of the frequency-domain received signal comprise a block of symbols; wherein for the first stage the one of the time-domain symbols is symbol $s(K-1)$; wherein for the second stage the new time-domain symbol is symbol $s(K-2)$; and wherein for a $g^{th}$ stage the new time-domain symbol is symbol $s(K-g)$, where K and g are integers.

18. The receiver of claim 12, wherein the electronic circuitry is configured to perform plural stages of detection to detect a first sub-block of symbols included in a block of symbols, and then to perform plural stages of detection for another sub-block of the block of symbols.

19. The receiver of claim 12, wherein the receiver comprises a base station and wherein the plural receive antennas are configured to receive the frequency-domain signal on an uplink channel.

20. The receiver of claim 19, wherein the uplink channel is at least one of a Physical Uplink Shared Channel (PUSCH) and a Physical Uplink Control Channel (PUCCH).

21. The receiver of claim 12, wherein the receiver comprises a base station comprising multiple receive antennas which operates in accordance with multiple-input, multiple-output (MIMO) technology.

* * * * *

UNITED STATES PATENT AND TRADEMARK OFFICE
CERTIFICATE OF CORRECTION

PATENT NO. : 8,542,781 B2  
APPLICATION NO. : 13/050697  
DATED : September 24, 2013  
INVENTOR(S) : Wang et al.

Page 1 of 1

It is certified that error appears in the above-identified patent and that said Letters Patent is hereby corrected as shown below:

In the Drawings

In Fig. 6, Sheet 5 of 12, delete "  " and insert -- 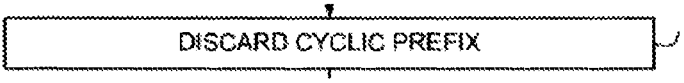 --, therefor.

In the Specification

In Column 9, Line 38, delete "=1" and insert -- =1. --, therefor.

In Column 17, Line 33, delete "entirety" and insert -- entirety. --, therefor.

Signed and Sealed this
Eleventh Day of February, 2014

Michelle K. Lee
*Deputy Director of the United States Patent and Trademark Office*